(No Model.) 2 Sheets—Sheet 2.
O. ROUSSEAU.
TOY.
No. 589,982. Patented Sept. 14, 1897.
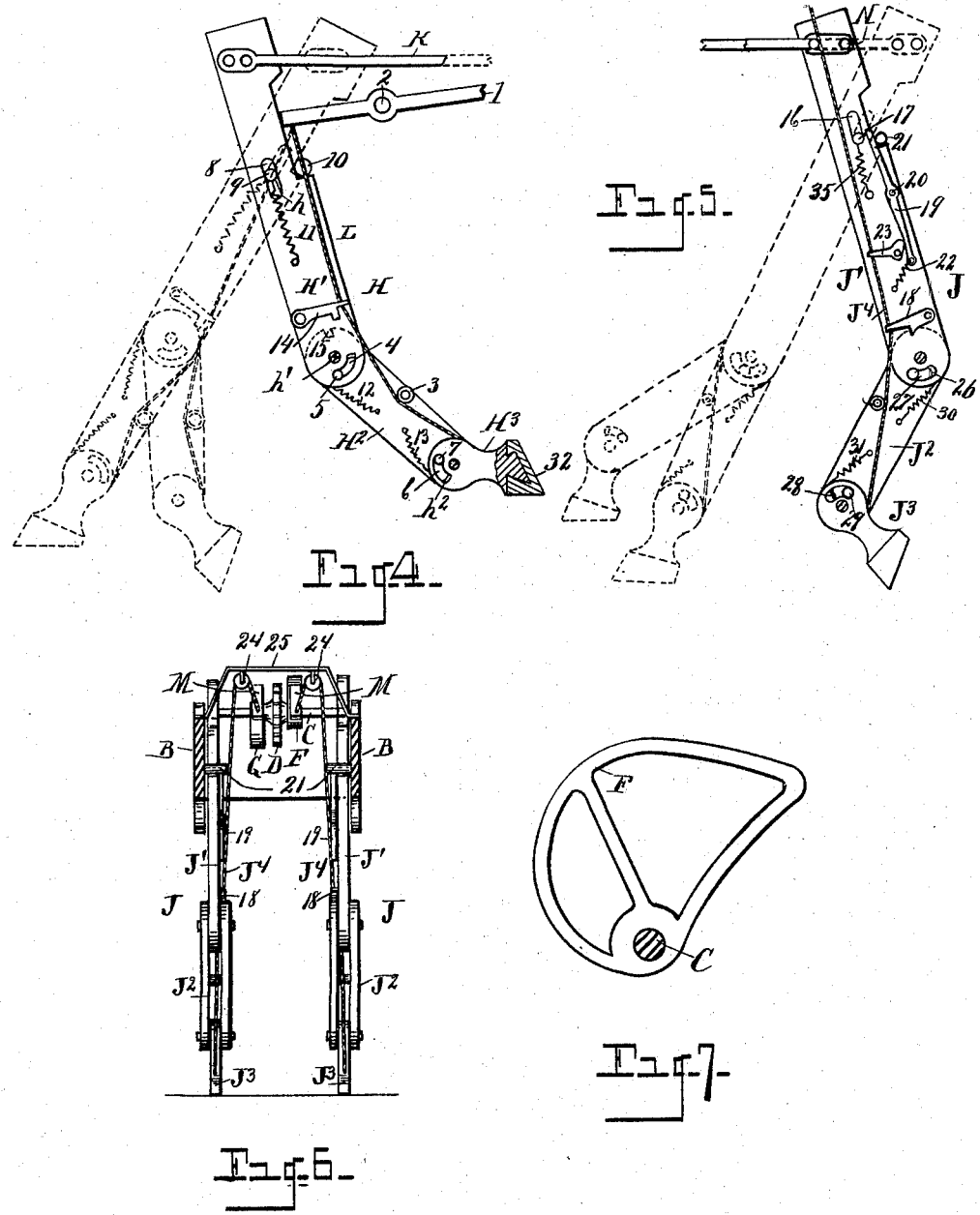
WITNESSES
O. B. Barnzyer
John F. Miller
INVENTOR
Onesime Rousseau
By his Attorney
Newell S. Wright

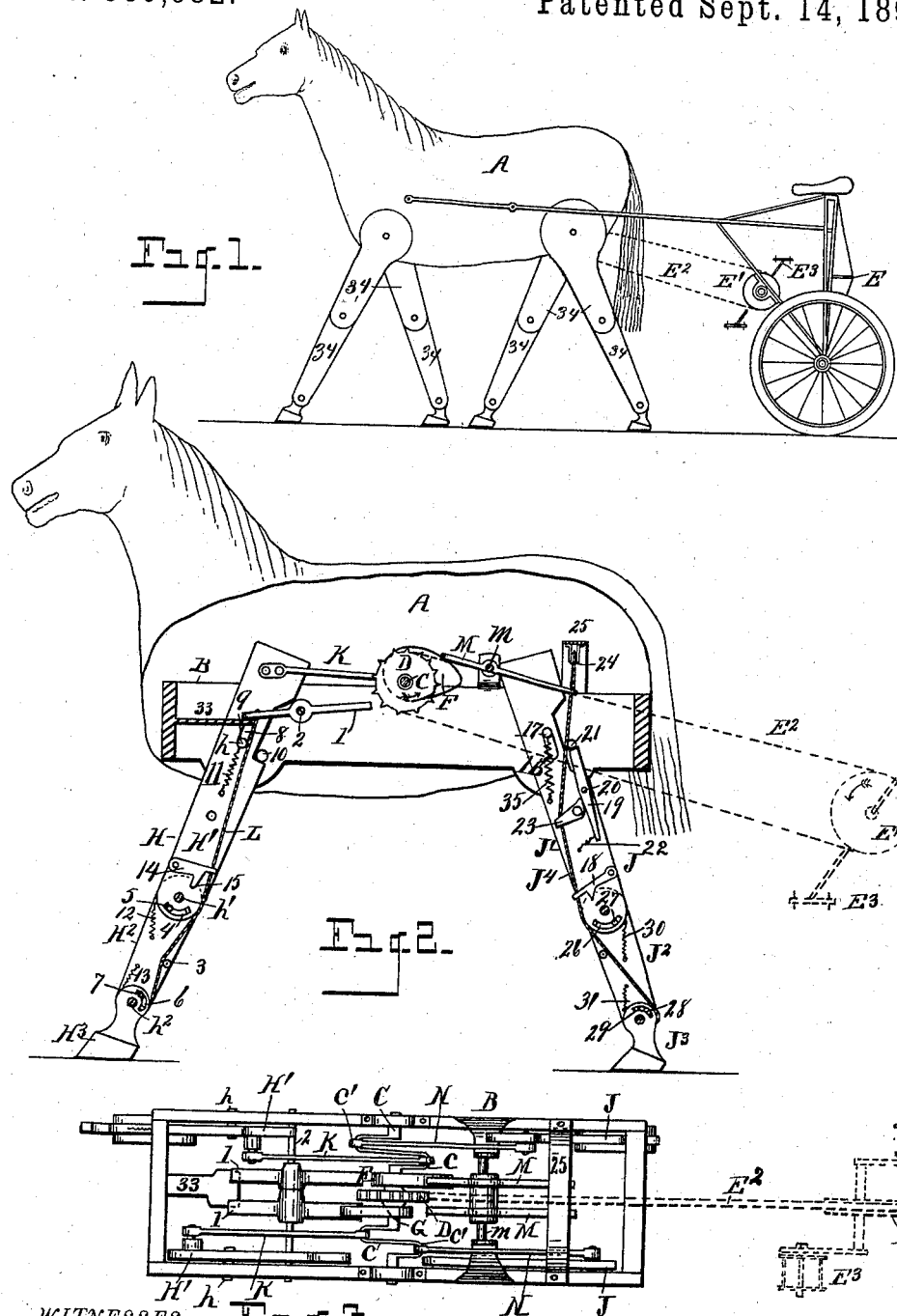

UNITED STATES PATENT OFFICE.

ONÉSIME ROUSSEAU, OF DETROIT, MICHIGAN.

TOY.

SPECIFICATION forming part of Letters Patent No. 589,982, dated September 14, 1897.

Application filed April 20, 1896. Serial No. 588,243. (No model.)

*To all whom it may concern:*

Be it known that I, ONÉSIME ROUSSEAU, a citizen of the United States, residing at Detroit, county of Wayne, State of Michigan, have invented a certain new and useful Improvement in Toys; and I declare the following to be a full, clear, and exact description of the invention, such as will enable others skilled in the art to which it appertains to make and use the same, reference being had to the accompanying drawings, which form a part of this specification.

My invention has for its object a novel toy consisting, essentially, of a simulated horse or other animal wherein the legs of the animal are made movable in a manner analogous to the legs of a horse or other animal in walking or trotting, the animal being propelled and its legs actuated by suitable mechanical appliances actuated by any suitable power.

In the accompanying drawings I have illustrated my invention as applied to a horse and its movements, the various mechanical features being shown as operated by a driving-shaft propelled by a sprocket-gear provided with pedals to drive said gear. I would have it understood, however, that I do not limit myself solely to this particular means of actuating the device, as any other suitable driving power may be employed.

My invention consists in the construction, combination, and arrangement of devices hereinafter specified and claimed, and illustrated in the accompanying drawings, in which—

Figure 1 is a view in side elevation. Fig. 2 is a view principally in vertical section on the line 2 2, Fig. 3. Fig. 3 is a plan view of the device with the body or inclosing case removed. Fig. 4 is a detail view of one of the fore legs shown in different positions which it assumes, in full and in dotted lines. Fig. 5 is a detail view of one of the hind legs, also shown in different positions which it assumes, in full and in dotted lines. Fig. 6 is a rear elevation. Fig. 7 is a detail view of one of the cams.

The purpose of my invention is to provide a toy of this nature which may be made of various sizes, as may be desired.

I carry out my invention as follows:

A represents an inclosing body or case which may be made to resemble the body of a horse or any other animal and within which the main portions of the actuating mechanism are concealed or located.

B represents a supporting-frame within the body A.

C denotes a crank-shaft journaled at its extremities in the frame B. Upon this crank-shaft is located a sprocket-gear D, or any other suitable device may be employed to drive the crank-shaft.

In Fig. 1 I have shown my device in connection with a sulky E, provided with a sprocket-gear E'. $E^2$ is a sprocket-chain connecting said sprocket-gears.

My invention may be employed in connection with any other suitable vehicle.

The sprocket-gear E' is shown provided with driving-pedals $E^3$ for driving the crank-shaft C. Upon the crank-shaft are located cams F and G, rotated by said shaft.

H denotes the front legs of the animal, and J the hind legs.

Fig. 2 shows one front leg and one hind leg. The companion front leg and hind leg are similarly constructed, respectively, and similarly actuated, only that the two cams F and G are so engaged upon the crank-shaft C as to actuate the corresponding front and hind legs on each side in reverse order, in order to simulate the actual movements of the legs of the animal on the two sides thereof in the movement of said legs.

The front legs H are formed with an upper arm H', fulcrumed to the frame B by a fulcrum-pin, (indicated at $h$.) The front leg is also formed with an intermediate arm $H^2$, having a jointed connection with the arm H', as indicated at $h'$, and with a foot $H^3$, having a jointed connection with the portion $H^2$, as indicated at $h^2$. Each fore leg is connected, toward the top of the arm H', by a connecting-rod K, with corresponding crank portions $c$ of the crank-shaft C, so that when said crank-shaft is rotated an oscillatory movement will be given thereby to the arm H' of the corresponding front leg upon its fulcrum $h$, thereby throwing the upper end of the corresponding front leg forward and backward, giving to each front leg the forward and backward movements analogous to those of an animal in movement.

To give the jointed portions $H^2$ and $H^3$ of each fore leg the proper swinging movements, I connect with each a corresponding lever, (indicated at the numeral 1,) said levers 1 1 fulcrumed upon a rod 2, engaged at its extremities with the frame B. Each of the levers 1 1 is connected with the foot portion $H^3$ of the leg by a corresponding cord L, connected with the forward end of each of said levers 1 1 and led over suitable pulleys 3, journaled in the arm $H^2$, which arm may be made with two sides, between which said rollers are journaled.

The lower end of each of the arms $H'$ is constructed with an elongated arc-shaped slot 4, in which a pin 5 is permitted to oscillate, said pin engaged with the arm $H^2$. In a similar manner the upper end of the foot portion $H^3$ is constructed with an elongated arc-shaped slot 6, in which a pin 7, engaged with the arm $H^2$, is permitted to oscillate. This mode of jointedly connecting the portions of the legs insures firmness, while at the same time the movement of the joints is limited by the pins striking against the extremities of the respective slots.

In the upper end of the arm $H'$ is an elongated slot, (indicated at 8,) in which is engaged a pin 9 in the frame B, permitting the arm $H'$ to shift its position in its oscillation. A stop 10 on the frame B limits the movement of the arm $H'$ in a corresponding direction. A spring 11 tends to draw the arm $H'$ against the pin 9. A spring 12, connected at one end with the arm $H'$ and at the opposite end with the arm $H^2$, serves to throw the pin 5 against the forward end of the slot 4 to normally hold the arm $H^2$ in extended position, while a spring 13, engaged at one end with the foot portion $H^3$ and with the arm $H^2$, tends to hold the pin 7 against the forward end of the slot 6, so that the different parts of the leg will all have a tendency to assume an extended position, yet allowing the various parts to yield at the joints. As an additional safeguard to prevent the portions of the leg from yielding forward I have provided a pawl 14, fulcrumed upon the arm $H'$, engageable in a recess 15 upon the upper end of the arm $H^2$.

The rear legs J are similarly constructed with upper arms $J'$, intermediate arms $J^2$, and a foot portion $J^3$. The rear legs are actuated also in a manner analogous to that of the fore legs, levers M M being provided fulcrumed upon a pin or bar $m$, having its extremities supported in the frame B and arranged to be operated by the corresponding cams F and G. Bars N N, engaged with cranked portions $c'\ c'$ of the crank-shaft and with the upper arms $J'\ J'$ of each of the rear legs, serve to oscillate the upper portions of said rear legs. The upper portions of the arms $J'$ are each formed with an elongated orifice 16 to receive a pin 17 on the frame B. A pawl 18 is provided to engage the upper end of the arm $H^2$ to limit the jointed movement of the latter arm rearward, while a cord $J^4$ connects the levers M with the foot portions $J^3$ in a manner similar to the connection of the cord L on the forward legs.

The slot 16, like the slot 8 of the forward legs, permits the leg to be lifted in its movement forward, so that it may swing freely off the ground or floor. A spring-latch 19, fulcrumed at 20, normally bears against a pin 21 upon the frame B, a spring 22 normally restoring the latch 19 to position against the pin 21.

The cord $J^4$ engages an eccentric 23, bearing against the latch 19, so that when the corresponding cam F or G manipulates the corresponding lever M the latch 19 may ride forward of the stop 21, being tilted by the eccentric 23 in the forward movement of the portion $J'$, at the end of which movement the latch 19 will resume its normal position in engagement with the stop 21.

It will be observed by reference especially to Fig. 3 that the cam F is acting upon the under side of the corresponding lever M at the same time that the cam G is acting upon the upper face of the corresponding lever 1 on the opposite side of the frame B, and vice versa. When the cam F is bearing downward upon the upper face of the corresponding lever 1, the cam G will be bearing upward upon the under face of the corresponding lever M on the opposite side of the frame. It will be apparent that therefore one hind leg at one side of the frame and one forward leg on the opposite side of the frame will be in the act of operation simultaneously, after which the other hind leg and opposite front leg will be actuated, the legs being thereby actuated in the same order and manner as the legs of an animal in walking or trotting.

Inasmuch as the cams F and G operate upon the levers M M from beneath said levers the corresponding cords $J^4$ are led over corresponding pulleys 24, suspended from a yoke 25 and then connected to the rear ends of said levers to give the proper direction of the pull of said levers upon said cord.

The pawl 14, which locks the arm $H^2$, is lifted out of engagement therewith by the lifting of the cord L, said cord being connected with the said pawl.

It is apparent that the pawls 14 and 18 must be lifted before the cords L or $J^4$ can lift the lower portions of the leg. At the extremities of the slots at the jointed engagement of the leg portions suitable packing may be located to prevent rattling and noise.

The rear legs are each jointedly connected in the manner analogous to similar portions of the front legs, the arm $J'$ being constructed with an elongated arc-shaped slot 26, engaged with a pin 27 on the arm $J^2$. The upper end of the foot portion $J^3$ is similarly constructed with an elongated arc-shaped slot 28, engaged by a pin 29 on the lower portion of the arm $J^2$.

Springs 30 and 31 serve to restore the foot portions J³ and arm J² to normal position and allow them to yield by a pull upon the cord J⁴.

Rubber hoofs, as indicated at 32, may be engaged with the lower ends of the foot portions.

33 indicate stops to limit the movement of the levers 1 1.

The leg portions may be provided with any suitable covering 34, shaped to conform to the various portions of the leg.

The operation of the device will be understood. When the crank-shaft is rotated, the connecting-rods K K and N N oscillate the leg portions, while the cams F G, acting upon the levers 1 1 and M M, exert a pull on the corresponding cords to raise the lower limbs of the corresponding legs, while the springs automatically restore said lower limbs of the leg portions to normal position.

The numeral 35 indicates a spring connected with each of the rear legs, and the corresponding pin 17 having obviously a tendency to lift the corresponding leg, which tendency, however, is overcome when the latch 19 is in engagement with the pin 21, as is shown in Fig. 2, but when the eccentric 23 is operated to bear against the latch 19 its upper end will be thrown out of engagement with the pin 21, as indicated in Fig. 5, in order to permit the lifting of the corresponding rear leg, so that it may be moved forward, it being necessary to lift the leg off the ground or floor in order to move it forward.

It will be understood that the pawls 14 and 18 may engage with the upper end of the adjacent portion of the doubly-formed arm J².

What I claim as my invention is—

1. In combination, a body, a transverse crank-shaft, cams mounted thereon, longitudinally of the body, front and rear legs, each having jointed portions, longitudinally-extended bars K and N connected with the upper ends of the legs, respectively, and with the crank-shaft, longitudinally-extended levers 1, 1 and M, M actuated by said cams, said levers connected with the lower portions of the legs, substantially as described.

2. In a toy, the combination of a body, a transverse crank-shaft, cams mounted thereon longitudinally of the body, front and rear legs, each having an upper arm, a foot portion, and an intermediate arm having a jointed connection with the upper arm and foot portion, longitudinally-extended levers actuated by said cams, to actuate the foot portion and intermediate arm of the legs, and longitudinally-extended bars connecting the upper ends of the upper leg portions with the crank-shaft, substantially as described.

3. In a toy, the combination of a crank-shaft, cams mounted thereon, legs, having jointedly-connected portions, levers actuated by said cams to actuate the jointed portions of the legs, and bars connecting the upper portions of the legs with the crank-shaft, said legs having a vertical and oscillatory movement, substantially as described.

4. In a toy, the combination of a supporting-frame, a transverse crank-shaft, cams mounted upon said shaft, front and rear legs each formed with an upper arm, a foot portion and an intermediate arm jointedly connected with the upper arm and foot portion, levers 1, 1 and M, M actuated by said cams to operate the front and rear legs, and means to raise the lower portions of each leg and retract said lower portions into normal position, said levers 1, 1 and the levers M, M acted upon on opposite sides of said cams, respectively, substantially as described.

5. In a toy, the combination of a supporting-frame, oscillatory forward and rear legs, each constructed with an upper arm, a foot portion, and an intermediate arm jointedly connected with the upper arm and foot portion, means to oscillate the foot portion and intermediate arm, said intermediate arm and upper arm, the one constructed with an elongated arc-shaped slot, the other provided with a pin in said slot, and said intermediate arm and foot portion, the one provided with an elongated arc-shaped slot, and the other with a pin engaged in said slot, for the purpose described.

6. In a toy, the combination of oscillatory front and rear legs, each constructed with an upper arm, a foot portion, and an intermediate arm jointedly connected with the upper arm and foot portion, a locking-pawl to limit the movement of the intermediate arm in its jointed connection with the upper arm, and means to release said locking-pawl and to oscillate said intermediate portion and foot portion, substantially as described.

7. In a toy, the combination of oscillatory rear legs, springs 35 to lift said legs, a pin 21, a latch fulcrumed to the corresponding leg to engage said pin, and means to throw the latch out of engagement with the pin, substantially as described.

8. In a toy, the combination of an oscillatory leg J, a spring to lift said leg, mechanism to lock the leg to counteract the tendency of said spring, and to unlock the same to permit the spring to exert its power, substantially as and for the purpose set forth.

9. In a toy, the combination of oscillatory legs, constructed of portions jointedly connected together, and a rubber hoof engaged with the lower portion of each of said legs, substantially as described.

In testimony whereof I sign this specification in the presence of two witnesses.

ONÉSIME ROUSSEAU.

Witnesses:
N. S. WRIGHT,
O. B. BAENZIGER.